United States Patent Office 3,267,029
Patented August 16, 1966

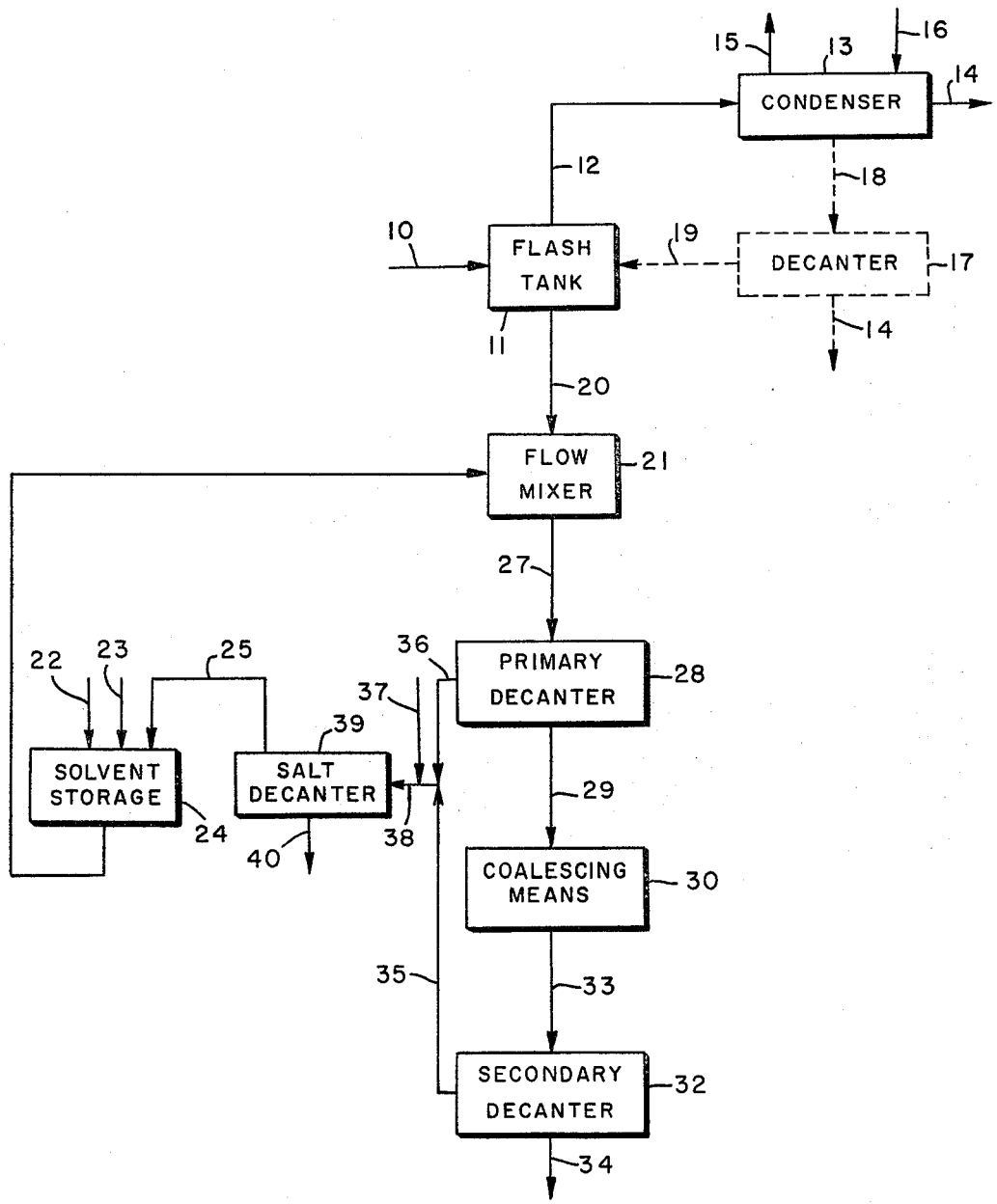

3,267,029
PROCESS FOR PURIFICATION OF AQUEOUS MIXTURES
Charles R. Campbell, Pensacola, Donald E. Danly, Cantonment, and Marion J. Mathews III, Pensacola, Fla., assignors to Monsanto Company, St. Louis, Mo., a corporation of Delaware
Continuation of application Ser. No. 243,473, Dec. 10, 1962. This application Jan. 6, 1965, Ser. No. 424,459
8 Claims. (Cl. 210—21)

This is a continuation of application Serial Number 243,473, filed December 10, 1962, now abandoned.

This invention relates to a process for the purification of aqueous mixtures and more particularly relates to a process for the removal of monobasic and dibasic acids, mineral acids, and other organic and inorganic material from aqueous mixtures prior to the discharge thereof to waste.

As is well known, commercial chemical processes and the products made therefrom are increasing in use and importance throughout all industries, and along with this increase in importance is the expanding need for production capacity within the chemical industry. Attending this expanding production capacity is the increasing industrial awareness of the necessity not to cause air and water pollution problems by the direct discharge to waste of chemical process streams containing residual amounts of organic and inorganic compounds high in chemical oxygen demand and which would have a deleterious effect upon the atmosphere or the streams and rivers.

Many methods and processes have been devised for the treatment of chemical waste streams such as filtration, settling ponds, biological oxidation and other well known means, but in most instances the apparatus necessary for the operation of these processes and the space required for the installation of the apparatus make the cost of the process almost prohibitive. Also, these known waste treatment processes generally bring with them waste disposal problems of their own such as sludge disposal and air pollution, and in many instances, do not remove the organic and inorganic waste sufficiently to prevent minor contamination problems.

An object of this invention, therefore, is to provide a new and novel process for the efficient and economical removal of organic and inorganic chemical compounds from waste aqueous process streams.

Another object of this invention is to provide a new and novel process for the removal of materials high in chemical oxygen demand from aqueous waste streams.

A further object of this invention is to provide a process for recovering organic monobasic and dibasic acids, mineral acids and other organic and inorganic materials from aqueous mixtures thereof.

Other objects and advantages of this invention will appear hereinafter.

An example of a commercially important chemical process which gives rise to a waste disposal problem is the production of pure dibasic acids by the oxidation of cycloparaffins. This process is of considerable commercial importance at the present time because of the extensive and expanding use of such acids in the preparation of polyamide resins and because of the ready availability of cyclic hydrocarbons as starting materials from which the acids may be made. Much art is known and available which describes processes for the direct oxidation of cycloparaffins to a variety of products including a mixture of monobasic and dibasic acids. Improvements in the processes known in the art have shown that yields of individual dibasic acids can be increased markedly when the oxidation is carried out in stages in which the cycloparaffins are air oxidized first to corresponding cyclic alcohols and ketones, and then the mixture of alcohols and ketones is nitric acid oxidized to a mixture of corresponding dibasic acids.

In the more sophisticated oxidation processes only selective portions of the air oxidation product are subjected to nitric acid oxidation, and mixtures of monobasic and dibasic acids are obtained which contain predominate amounts of a single dibasic acid and only minor amounts of other monobasic and dibasic acids. In accordance with this two step oxidation process, cycloparaffins are first air oxidized and a selective part of the air oxidation product is nitric acid oxidized to give mixture of monobasic and dibasic acids predominant in one dibasic acid in an aqueous nitric acid solution. Either this aqueous mixture or the mother liquor remaining after crystallization of a portion of the predominant dibasic acid therefrom is subjected to evaporating conditions to reduce the nitric acid concentration of the liquor, and further crystallization of the predominant dibasic acid is effected. The mother liquor from this second crystallization contains additional dibasic acids which cannot be crystallized successfully, and therefore, the mixture of dibasic acids contained in this second mother liquor or the mixture remaining after a second evaporation to reduce the nitric acid concentration may be separated, if desired, from each other in excellent yields by treatment with a suitable immiscible solvent or other means to permit recovery of substantially all the dibasic acids contained therein.

An example of such a process is the manufacture of adipic acid by the air oxidation of cyclohexane followed by the nitric acid oxidation of a selective portion of the air oxidation product. In this process the aqueous nitric acid mixture resulting from nitric acid oxidation is predominantly adipic acid and contains other dibasic acids such as glutaric and succinic as well as monobasic acids.

An example of a waste aqueous stream which is high in chemical oxygen demand and which cannot be discharged safely without treatment is the aqueous mixture which results from the overhead or make stream from the evaporation, either before or after crystallization of adipic acid, of the aqueous product of the nitric acid oxidation described above. It is with reference to this aqueous waste stream that this invention will be described; however, the process of this invention is clearly applicable to the purification of any waste aqueous mixture containing organic acids, mineral acids, and other organic and inorganic material making the water not safe for non-chemical polluting waste discharge.

By the process of this invention, the aqueous mixture described above, or any similar aqueous mixture, is contacted either in single or multiple stages with a liquid ion-exchange material dissolved in a suitable solvent to remove the chemical oxygen demand causing components in the solvent phase, thereby leaving purified water suitable for safe, non-chemical polluting waste discharge to rivers or other natural waste areas. The resulting solvent phase may be contacted with an inorganic base, anhydrous ammonia, an aqueous solution of an inorganic base or ammonia, or mixtures thereof to regenerate the solvent solution of ion-exchange material for recycle or other use, and the remaining concentrated aqueous solution of salts of the organic acids and other chemical oxygen demand causing components which remain in much reduced volume may be disposed of by incineration or other suitable non-polluting means or recovered for profitable use.

In order to illustrate further the process of this invention, reference will be made to the accompanying diagrammatic drawing in which:

The figure is a flow sheet for the process of this invention in which chemical oxygen demand causing components in aqueous solutions are removed to permit safe water discharge.

In all instances, the same numbers are used to indicate the same means or part of the process.

Referring now to the figure, there is shown schematically a preferred embodiment of the new and novel process of this invention. The aqueous solution from which the high chemical oxygen demand material must be removed prior to the discharge of the water to waste enters the process of this invention as indicated at 10. In the example of the aqueous mixture for which the process of this invention will be described, the nitric acid concentration of this aqueous mixture may be from zero to one percent by weight of the water therein; however, generally the nitric acid concentration may be between 0.05 and 0.5 percent by weight. The water soluble organic acid concentration of this aqueous mixture may be from zero to 5.0 percent by weight of the water therein, however, generally may be between 0.1% and 3.0%.

Non-acidic organic liquids which may be entrained in the aqueous mixture to be purified and which may operate as a solvent or ion-exchange resin contaminant, both of which will be described later, may be flashed overhead in flash tank, 11, with heat supplied by a source, not shown, or these organic liquids may be removed by any other means such as decanting or other. The overhead stream, as indicated at 12, may be condensed in condenser 13 and discharged to a sump or other as indicated by line 14. Cooling water for condenser 13 enters at 16 and exits at 15.

As an example, cyclohexylnitrate may be present in the described aqueous mixture to be purified in a concentration up to 4000 parts per million, and since this material will concentrate in the immiscible solvent, to be described later, causing continuing dilution of the ion-exchange resin, also to be described later, the cyclohexylnitrate may be flashed overhead with a portion of the water by introducing waste process steam into feed line 10 or into flash tank 11.

If it is desired to reduce the volume of liquid flowing in line 14, decanter 17 may be provided. If the process is operated in this manner all or a part of the liquid condensed in condenser 13 may proceed, as indicated by line 18, to decanter 17 where the liquid is permitted to separate into an aqueous layer and a water immiscible layer with the aqueous layer being returned to the process, as indicated by line 19, and the water immiscible layer being discharged to a sump or other suitable waste disposable means, as indicated by 14.

Ion-exchange resin and solvent are introduced to the process of the invention, as indicated by lines 22 and 23 respectively, and a solvent solution of the ion-exchange resin may be prepared by mixing or other means and maintained for use in the process in solvent storage 24. In operation or after a sufficient quantity of solvent solution of ion-exchange resin has been prepared, only minor quantities of solvent and ion-exchange resin may be added to the process by their respective lines to provide make-up with the major quantity of solvent for the process being provided by recycled regenerated solvent solution of ion-exchange resin as indicated by line 25.

The ion-exchange resin may be liquid or a solid capable of forming a solution, and may be any one of a mixture of more than one of any of a number of commercially available mixtures of high molecular weight primary, secondary or tertiary amines. Several of such ion-exchange resins are marketed under the trademark "Amberlite" by Rohm and Haas Company with the designation LA-1 and LA-2. In the preferred embodiment being described, "Amberlite" LA-2 may be used as the liquid ion-exchange resin, and the properties thereof are shown in Table 1 below.

*Table 1.—Properties of "Amberlite" LA-2*

| | |
|---|---|
| Molecular weight | 353–395. |
| Neutral equivalent | 360–380. |
| Acid binding capacity: | |
|   milliequivalents per gram | 2.6–2.8. |
|   Milliequivalents per milliliter | 2.2–2.3. |
| Appearance | Clear, amber liquid. |
| Odor | Faint, pleasant amine. |
| Viscosity at 25° C., centipoise | 18. |
| Density at 25° C.; lb./gal. | 6.9. |
| Freezing point, ° C. | 10. |
| Flash point, Cleveland open cup, ° C. | 180. |
| Fifty percent distilled point at 10 mm. Hg, ° C. | 224. |
| Solubility in 1 normal $H_2SO_4$, p.p.m. | 0. |

The solvent used as carrier for the ion-exchange resin may be any organic liquid material or mixture of organic liquid materials miscible with the ion-exchange resin but substantially immiscible with water, such as xylene, benzene, mixed aromatic organic liquids having more than nine carbon atoms, and kerosene.

The ion-exchange resin and the solvent may be mixed in any manner such as mechanical stirring or flow mixing, and the concentration by weight of the ion-exchange resin in the solvent may be between 1% and 100% with the preferred concentration range being between 10% and 30% by weight.

In the example of the process being described, the solvent may be either kerosene or xylene with kerosene being preferred, and the concentration of the "Amberlite" LA-2 in the kerosene or xylene may be 25 percent by weight.

The solvent solution of ion-exchange resin proceeds to flow mixer, 21 as indicated by line 26, where it is mixed with the aqueous mixture, indicated entering flow mixer, 21, by line 20.

The flow mixing of the solvent solution and the aqueous mixture may be accomplished by any suitable means which will provide good contacting of the solvent solution of ion-exchange resin and the aqueous mixture for good extraction efficiency, but will not cause a dispersion of solvent solution in the aqueous mixture that is extremely slow in separating in subsequent steps of the process. As an example, in the embodiment being described, pumping of the solvent solution and the aqueous mixture may introduce sufficient energy to form a tight emulsion which is extremely difficult to separate and may require excessive holdup periods to separate into two phases. Proper mixing may be obtained by using a ball-type mixing valve and controlling the pressure drop across the valve. The amount of the pressure drop which is necessary and suitable is dependent upon the solvent used and the aqueous mixture to be purified, as well as other factors; and in the embodiment of the process being described, the pressure drop may be controlled at one pound per square inch.

The solvent solution to aqueous mixture ratio which is necessary is dependent upon many factors such as the chemical oxygen demand of the aqueous mixture or its acidity, the concentration of the ion-exchange resin in the solvent, and others. It has been found in the embodiment being described that when the acidity of the aqueous mixture is not in excess of 1.0 normal, the ratio of equivalents of ion-exchange resin in the solvent to equivalents of acidity in aqueous mixture may be as low as 0.75 with good purification results being obtained. As is clear to those skilled in the art, the ratio of solvent solution of ion-exchange resin to the aqueous mixture may be adjusted accordingly depending upon the ion-exchange resin concentration in the solvent and the acidity of the aqueous mixture.

After mixing, the combined mixture of ion-exchange resin solution and aqueous mixture proceeds, as indicated by line 27, to primary decanter 28 where the combined mixture is permitted to separate into an immiscible solvent phase and an aqueous phase. Primary decanter 28 may be of any design well known and suitable for the separation of two phase systems and should be of sufficient size to provide adequate holdup time in the process to permit good separation of the immiscible solvent phase and the aqueous phase. In the described example, it has been found that the holdup time for good separation of the kerosene or xylene phase from the aqueous phase should be no less than five minutes to prevent entrainment of the aqueous phase in the solvent phase or excessive carry-over of the solvent phase in the aqueous phase.

The aqueous phase containing a small amount of non-separated solvent proceeds, as indicated by line 29, to coalescing means 30 where the solvent phase which did not separate in primary decanter is coalesced to assist in its separation in secondary decanter 32. Any suitable coalescing media such as sand or other may be used in coalescing means 30, and in the process of the example, 10 to 20 mesh sand in a bed six feet high may be used successfully as the coalescing media at mass flow rates at least as high as 4500 pounds per hour per square foot.

After passing through coalescing means 30, the aqueous phase proceeds, as indicated by line 33, to secondary decanter 32 where the final separation of the aqueous and immiscible solvent phases is permitted to take place. Secondary decanter 32 may be of any type of vessel and design well known to those skilled in the art and may be sufficiently large to provide adequate holdup time for good separation or the inlet to the vessel may be sufficiently large to provide sufficient deceleration of the velocity of the material prior to its entry into the main body of the decanter to provide good separation in a smaller vessel. In the process of the example, it has been found that a vessel sufficiently large to provide a separating holdup time of two to four minutes is adequate for the liquid provided the inlet to the vessel is such that fluid velocities therein are in the order of magnitude of 0.3 to 2.5 feet per second.

After separation of the phases in secondary decanter 32, the resulting aqueous phase which is now substantially free of chemical oxygen demand material may be discharged safely to any river, pond or other without danger of pollution, as indicated by line 34. The resulting immiscible solvent phase may be joined, as indicated by line 35, with the immiscible solvent phase leaving primary decanter 28, as indicated by line 36, for recovery and regeneration of the solvent solution of ion-exchange resin.

Regenerating material is added to the immiscible solvent phase, as indicated by line 37, and this mixture proceeds, as shown by line 38, to decanter 39 where the regenerated solvent solution of ion-exchange resin is separated either from an aqueous phase or a precipitate and returned to solvent storage 24, as indicated by line 25. The aqueous phase or the precipitate formed in the regeneration is removed from the process as indicated by line 40.

The regenerating material added as indicated at 37 may be an inorganic base, anhydrous ammonia, an aqueous solution of an inorganic base or ammonia, or mixtures thereof. If an aqueous solution of an inorganic base or ammonia is used, an aqueous phase is separated from the solvent solution of the ion-exchange resin in decanter 39 and removed at 40; and if anhydrous ammonia or an inorganic base is used, a precipitate is separated and removed.

Contacting of the spent immiscible solvent phase of lines 35 and 36 with the regenerating material of line 37 may be accomplished by any suitable means that is convenient and efficient, and in the example of the process being described, contacting of the aqueous ammonia, which may be the regenerating material, and the spent immiscible solvent solution may be effected in a recirculating centrifugal pump.

As is clear to those skilled in the art, care must be taken in controlling the amount of regenerating material added to the process. If insufficient regenerating material is added, the ion-exchange resin solution will not be regenerated completely and the efficiency of the process will be reduced; and if an excessive amount of regenerating material is added, it will be returned to the process along with the solvent solution where it will prevent preferentially the ion-exchange material from effecting efficient removal of the chemical oxygen demand material from the aqueous stream to be treated. In the example being described, a slight excess of the stoichiometric amount of ammonia needed to neutralize the chemical oxygen demand material in the solvent solution may be used.

The results of a typical operation of a single stage process of this invention on a continuous basis according to the preferred embodiment are summarized in Table 2, below, wherein all numbers are in pounds per hour unless otherwise specified. In Table 2, the column identified as "feed" is line 10 in FIGURE 1, and the column identified as "product" is line 34 in FIGURE 1.

*Table 2*

|  | Feed | Product |
|---|---|---|
| Water | 100,000 | 97,137 |
| Nitric Acid | 287 | 0 |
| Organic Acids | 729 | 176 |
| Ammonium Salts | 0 | 22 |
| Solvent | 0 | 9 |
| Cyclohexylnitrate | 49 | 5 |

As can be seen clearly from the above results, all of the inorganic acid and approximately 76% of the organic acids can be removed simply by the single stage process of this invention. It is clear, also, that multistage purification by the use of this process can be accomplished easily if it is desired to reduce the chemical oxygen demand of the product below that which is possible with the use of a single stage. Further advantages are available in the process of this invention in that no costly equipment is necessary for the process and the operation of the process is itself economical and trouble-free. Other advantages of the process will be apparent to those skilled in the art.

While in the foregoing specifications only a single embodiment has been set forth and specific details elaborated for the purpose of illustration, it will be apparent to those skilled in the art that this invention is susceptible to other embodiments and that many of these details may be varied widely without departing from the basic concept and the spirit of the invention. It is to be understood that the invention is not to be limited to the specific embodiments thereof except as defined in the appended claims.

We claim:
1. A process for removal of water-soluble organic chemical-oxygen-demand material from an aqueous stream containing said material in a concentration not substantially in excess of 5.0%, by weight, which process comprises, in combination, the steps of:
   (a) preparing a 10% to 30%, by weight, solution of basic ion-exchange resin in organic solvent, said organic solvent being miscible with said ion-exchange resin and substantially immiscible with water;
   (b) flow-mixing at a pressure drop not substantially in excess of one pound per square inch said aqueous stream and sufficient prepared ion-exchange resin solution to provide a ratio of equivalents of ion-exchange resin to equivalents of said water-soluble or- ganic chemical-oxygen-demand material of at least 0.75;

(c) permitting the resulting mixture of step (b) to remain substantially quiescent for a period of at least five minutes to form a first aqueous phase and a first immiscible solvent phase;

(d) subjecting said first aqueous phase to coalescing means to coalesce non-separated immiscible solvent solution remaining therein;

(e) permitting the effluent from said coalescing means to separate into a second aqueous phase and a second immiscible solvent phase; and (f) discharging said second aqueous phase to waste as substantially chemical-oxygen-demand free water.

2. The process of claim 1 wherein said basic ion-exchange resin is a member selected from the group consisting of high molecular weight primary, secondary, and tertiary amines.

3. The process of claim 1 wherein said basic ion-exchange resin is a liquid having

| | |
|---|---|
| Molecular weight | 353–395. |
| Neutral equivalent | 360–380. |
| Acid binding capacity, | |
| Milliequivalents per gram | 2.6–2.8. |
| Milliequivalents per milliliters | 2.2–2.3. |
| Appearance | Clear, amber liquid. |
| Odor | Faint, pleasant amine. |
| Viscosity at 25° C., centipoise | 18. |
| Density at 25° C.; lb./gal. | 6.9. |
| Freezing point, ° C. | 10. |
| Flash point, Cleveland open Cup ° C. | 180. |
| Fifty percent distilled point at 10 mm. Hg, ° C. | 224. |
| Solubility in 1 normal $H_2SO_4$ p.p.m. | 0. |

4. The process of claim 1 wherein said organic solvent is an organic solvent selected from the group consisting of xylene, benzene, kerosene, and mixed aromatic organic liquids having more than nine carbon atoms.

5. The process of claim 1 wherein said coalescing means is sand.

6. A process for removal of water-soluble organic chemical-oxygen-demand material from an aqueous stream containing said material in a concentration not substantially in excess of 5.0%, by weight, which process comprises, in combination, the steps of:

(a) preparing a 10% to 30%, by weight, solution of basic ion-exchange resin in organic solvent, said organic solvent being miscible with said ion-exchange resin and substantially immiscible with water;

(b) flow-mixing at a pressure drop not substantially in excess of one pound per square inch said aqueous stream and sufficient prepared ion-exchange resin solution to provide a ratio of equivalents of ion-exchange resin to equivalents of said water-soluble organic chemical-oxygen-demand material of at least 0.75;

(c) permitting the resulting mixture of step (b) to remain substantially quiescent for a period of at least five minutes to form a first aqueous phase and a first immiscible solvent phase;

(d) subjecting said first aqueous phase to coalescing means to coalesce non-separated immiscible solvent solution remaining therein;

(e) permitting the effluent from said coalescing means to separate into a second aqueous phase and a second immiscible solvent phase;

(f) discharging said second aqueous phase to waste as substantially chemical-oxygen-demand free water;

(g) combining said first immiscible solvent phase and said second immiscible solvent phase for regeneration of ion-exchange resin contained therein;

(h) contacting the combined phases with an amount of regenerating material slightly in excess of the stoichiometric amount necessary for regeneration;

(i) separating formed insoluble material from said combined phases; and (j) recovering remaining combined phases for use as said prepared ion-exchange resin solution.

7. The process of claim 6 wherein said formed insoluble material is a third aqueous phase.

8. The process of claim 6 wherein said formed insoluble material is a precipitate.

References Cited by the Examiner
UNITED STATES PATENTS 3,074,820  1/1963  Kunin _____ 210—21

OTHER REFERENCES

Helfferich: "Ion Exchange," copyright 1962, by The McGraw-Hill Book Co., Inc., pp. 19–20 relied upon.

References Cited by the Applicant
UNITED STATES PATENTS 2,738,322  3/1956  Bauman et al.
3,047,516  7/1962  Feldt et al.

OTHER REFERENCES

"Text," Ion Exchange in Organic and Biochemistry (pages 261–265 relied upon), by Calmon and Kressman, copyright 1957, by Interscience Publishers, Inc.

MORRIS O. WOLK, *Primary Examiner.*

E. G. WHITBY, *Assistant Examiner.*